Sept. 12, 1950     L. EISENMAN     2,522,105

FENDER ATTACHMENT FOR AUTOMOBILES

Filed June 18, 1946

Inventor
LOUIS EISENMAN
By Emery Holcomb & Blair
Attorneys

Patented Sept. 12, 1950

2,522,105

UNITED STATES PATENT OFFICE 2,522,105

FENDER ATTACHMENT FOR AUTOMOBILES

Louis Eisenman, Brooklyn, N. Y.

Application June 18, 1946, Serial No. 677,635

1 Claim. (Cl. 248—43)

This invention relates to attachment for automobiles and more particularly to a sighting or guiding device adapted to be applied particularly to the forward right-hand fender, and adapted to aid the driver better to ascertain the relative position of the fender with respect to the curb when entering a parking place or to the distance between the right fender and another car as when passing. Although the device is more particularly of use under such circumstances, it will be appreciated that without material alteration the device is also applicable as a radio antenna or signal light support, and may be used on either side of the vehicle.

One of the objects of the present invention is to provide a mechanism or attachment of the above character which may be easily and quickly applied to fenders of usual construction without the necessity of special tools or other fastening devices.

Another object is to provide a simple and practical mechanism of the above character which may be easily and quickly mounted upon or detached from the usual fender as well as one having relatively few parts to manufacture and assemble.

A further object is to provide a device which may be firmly secured or mounted upon the fender free from danger of accidental loosening and becoming lost or displaced in its mounting upon the fender.

Other objects will be in part obvious from the annexed drawings and in part hereinafter indicated in connection therewith by the following analysis of this invention.

This invention accordingly consists in the features of construction, combination of parts, and in the unique relation of the members and in the relative proportioning and disposition thereof, all as more completely outlined herein.

To enable others skilled in the art fully to comprehend the underlying features of this invention, that they may embody the same by the modifications in structure and relation contemplated by the invention, drawings depicting the preferred embodiments of the invention form a part of this disclosure, and in such drawings like characters of reference denote corresponding parts throughout the several views in which—

Figure 4:
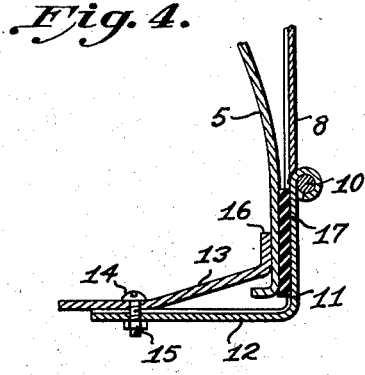
Fig. 4 is a detail view taken at right angles to Fig. 3.

Referring now to the drawings in detail, 5 indicates an automobile with a forward right-hand fender upon which is mounted an indicator tube 6 which may be telescopic, if desired, having a sight or light 7 at the top thereof. The lower part of the telescopic tube 6 fits into a mounting comprising a hinge-like member having a vertical part 8 carrying the tube 6, a pintle pin 10 and a lower part 11 angular or L-shaped at its lower end 12 to which is secured a gripping plate 13 pivotally connected to the part 12 by bolt 14 having a nut 15 which holds the part securely in place to grip opposite sides of the fender 5 as shown in Fig. 4. The part 13 has an upturned portion 16 extending parallel to the adjacent inside wall of the fender, a rubber pad 17 is preferably mounted between the fender 5 and the part 11 whereby the fender will be gripped between the cushioning pad 17 braced against the surface 11 and the member 13 when the screw bolt 14 is tightened. By wedging the parts 13 and 11 against the pad 17 and the fender 5 there is less danger of the fastening means becoming loosened or detached, and lost by accident.

Figure 1:
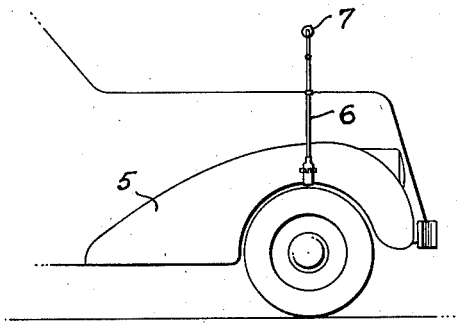
Fig. 1 is an elevational view of one form of the device as installed on an automobile and applicable as a sight or signal light.
Figure 2:
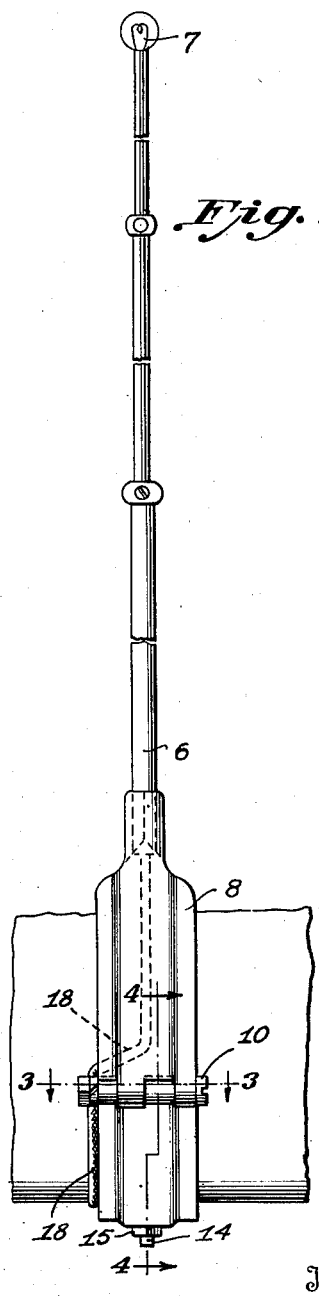
Fig. 2 is an enlarged detail view showing the device as applicable not only as a sight but also radio antenna or signal.

When the device is used as an antenna, electrical connections are provided as may be necessary, and in the present case merely include a conductor 18 the outer end of which is projected within the formations of the part 8 before passing up the tube 6 as shown in Fig. 2 to the top 7 of the telescopic staff 6, the lower or inner end of the conductor 18 is attached to the source of current of the radio receiving mechanism (not shown) in the usual manner. It will be noted that the pintle pin 10 is preferably in the form of a bolt which may be adjusted to the desired tension and permits the pole 6 to be swung downwardly to a horizontal position as and when necessary.

Figure 3:
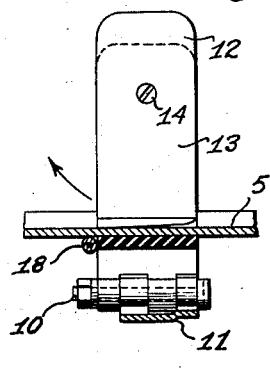
Fig. 3 is a detail plan view partly in section of the mounting upon the fender.

By reference to Fig. 3 it will be seen that the part 13 is beveled at its inner end whereby the clamp will be loosened by swinging towards the left as indicated by the arrow or wedged in very tight relation by force in turning in the opposite direction. The device, as a whole, is of simple and practical construction and may be easily and quickly applied or removed as necessary.

While it will be apparent that the illustrated embodiments of this invention herein disclosed are well calculated adequately to fulfill the objects and advantages primarily stated, it is to be

I claim:

A clamp for attaching a staff to an automobile fender comprising an L-shaped member having a vertical arm adapted to extend upwardly outside the fender and a horizontal arm adapted to pass beneath the fender, a yielding pad mounted on the inner side of said vertical arm, a vertical pivot member fixed against lateral movement in said horizontal arm, and a gripping plate mounted on said pivot member above said horizontal arm and adapted to be swung about said pivot member against said fender to wedge said fender between said gripping plate and said yielding pad.

LOUIS EISENMAN.

REFERENCES CITED

The following references are of record in the file of this patent:

UNITED STATES PATENTS

| Number | Name | Date |
| --- | --- | --- |
| 1,779,051 | Shirley et al. | Oct. 21, 1930 |
| 1,834,682 | Colstad | Dec. 1, 1931 |
| 2,087,217 | Cohen | July 13, 1937 |
| 2,121,317 | Cohen | June 21, 1938 |
| 2,390,760 | Watson | Dec. 11, 1945 |